(12) United States Patent
Kiełczykowski et al.

(10) Patent No.: US 12,191,075 B2
(45) Date of Patent: Jan. 7, 2025

(54) ACTUATOR RELEASE MECHANISM

(71) Applicant: Hamilton Sundstrand Corporation, Charlotte, NC (US)

(72) Inventors: Przemysław Kiełczykowski, Milicz (PL); Marek Wit, Jawor (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/205,088

(22) Filed: Jun. 2, 2023

(65) Prior Publication Data
US 2023/0392566 A1 Dec. 7, 2023

(30) Foreign Application Priority Data
Jun. 2, 2022 (EP) ................... 22461562

(51) Int. Cl.
*H01F 7/14* (2006.01)
*B64D 41/00* (2006.01)
*G05G 5/06* (2006.01)

(52) U.S. Cl.
CPC ............ *H01F 7/14* (2013.01); *B64D 41/007* (2013.01); *G05G 5/06* (2013.01); *F05D 2220/34* (2013.01)

(58) Field of Classification Search
CPC .................................................. F05D 2220/34
See application file for complete search history.

(56) References Cited
U.S. PATENT DOCUMENTS

| 8,148,670 B2 | 4/2012 | Tong et al. |
| 8,640,563 B2 | 2/2014 | Lang et al. |
| 9,193,472 B2 | 11/2015 | Sasscer |
| 10,113,568 B2 | 10/2018 | Bannon |
| 10,310,543 B2 | 6/2019 | Kiełczykowski et al. |
| 10,352,416 B2 | 7/2019 | Trybula |

(Continued)

FOREIGN PATENT DOCUMENTS

| EP | 3112270 A1 | 1/2017 |
| EP | 3184437 A1 | 6/2017 |

(Continued)

OTHER PUBLICATIONS

Extended European Search Report for International Application No. 22461562.5 dated Nov. 2, 2022, 5 pages.

*Primary Examiner* — Vicky A Johnson
(74) *Attorney, Agent, or Firm* — CANTOR COLBURN LLP

(57) ABSTRACT

An actuator release mechanism includes: a longitudinal sleeve movable along an axis between a lock and release positions; drive means for causing the longitudinal sleeve to move along the axis; and bias means to bias the longitudinal sleeve to the lock position. The drive means includes: a rotary solenoid having a first direction of rotation and a second direction of rotation; a toggle member having a toggle shaft connected to and rotatable with the rotary solenoid, and a toggle head in engagement with the longitudinal sleeve by pins extending radially inwards from the longitudinal sleeve and a helical guide rail provided on a radially outer surface of the toggle head. The longitudinal sleeve is mounted around the toggle head, such that rotation of the solenoid causes rotation of the toggle member and the guide rails which causes the pin(s) to ride along the guide rail to rotate the sleeve.

12 Claims, 8 Drawing Sheets

(56) References Cited

U.S. PATENT DOCUMENTS

| | | |
|---|---|---|
| 10,808,808 B2 | 10/2020 | Crine et al. |
| 2008/0303290 A1* | 12/2008 | Yuan ..................... E05B 47/06 |
| | | 292/195 |
| 2013/0327207 A1 | 12/2013 | Sasscer et al. |
| 2015/0096437 A1 | 4/2015 | Russ et al. |
| 2015/0232195 A1 | 8/2015 | Bannon |
| 2017/0241453 A1* | 8/2017 | Bannon ................ B64D 41/007 |
| 2020/0298992 A1* | 9/2020 | Kuehn ................ B64D 41/007 |

FOREIGN PATENT DOCUMENTS

| | | |
|---|---|---|
| EP | 3239052 A1 | 11/2017 |
| EP | 3305664 A1 | 4/2018 |

\* cited by examiner

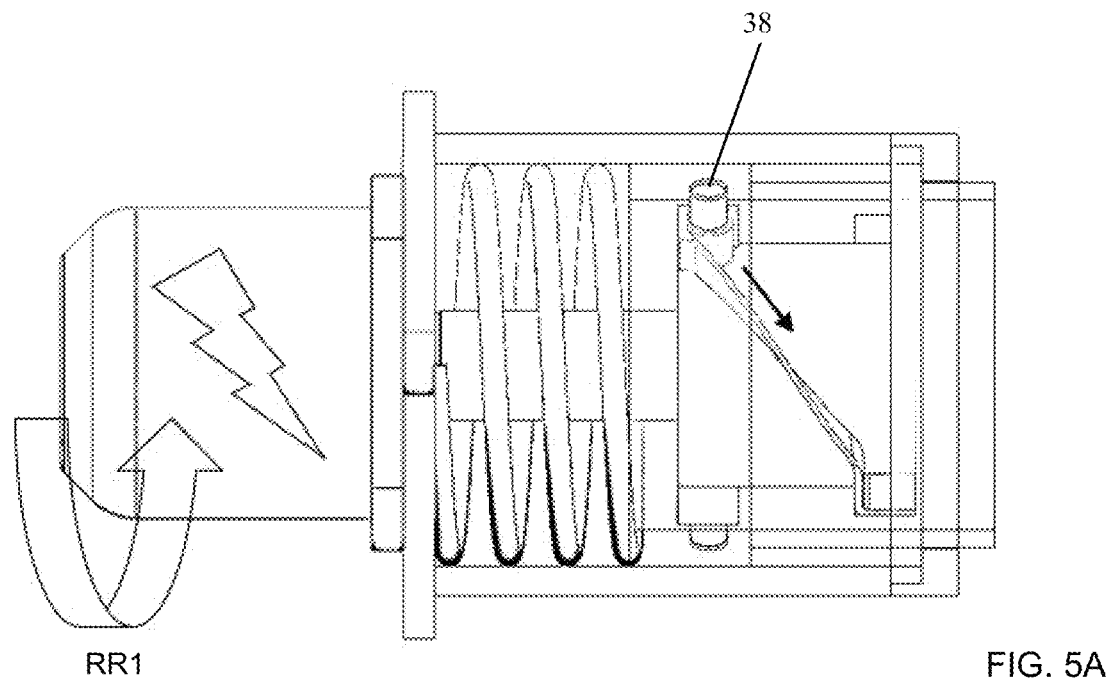
RR1          FIG. 5A
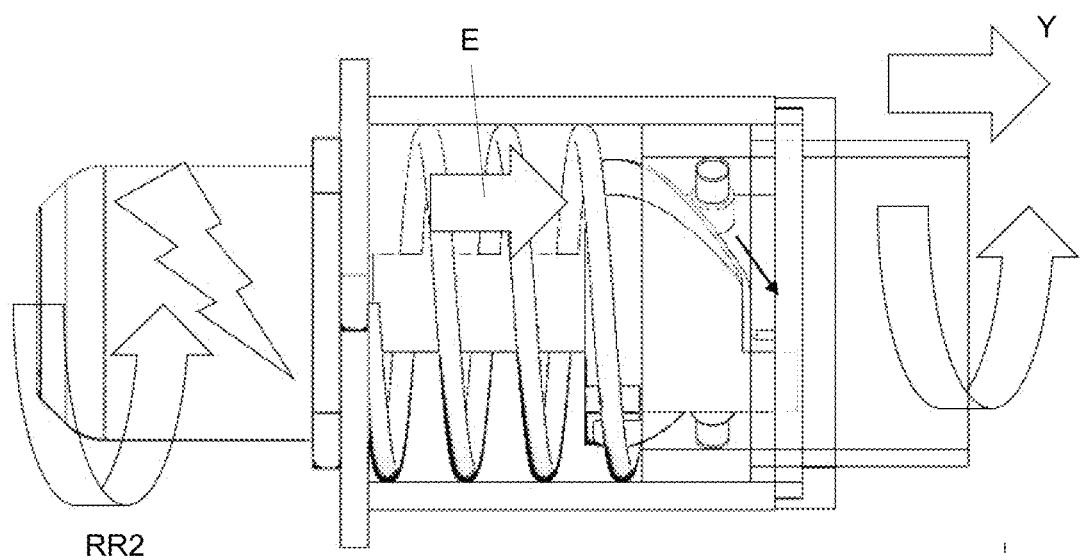
RR2          FIG. 5B

ACTUATOR RELEASE MECHANISM

CROSS-REFERENCE TO RELATED APPLICATIONS

This application claims priority to European Patent Application No. 22461562.5 filed Jun. 2, 2022, the entire contents of which is incorporated herein by reference.

TECHNICAL FIELD

The present disclosure relates to release and locking mechanisms for deployable components. The mechanism is particularly suitable as an unlocking or release mechanism for a ram air turbine (RAT) actuator but could also find application in other deployable or movable systems such as other actuators, valves, pumps and the like.

BACKGROUND

Many systems and mechanisms are known in which a component is movable between a closed or stowed position and an open or deployed position, and wherein a component should be locked in the desired position and unlocked to permit movement between the positions. Particular examples are valves or actuators, such as RAT actuators as described in more detail below.

Locking mechanisms are known to secure the actuator, valve etc. in a particular position, and unlocking mechanisms are known to release the locking mechanism and permit movement of the actuator/valve components to a different position, whereupon the actuator components can then also be locked in the second position by means of a locking mechanism. A locking mechanism for a RAT actuator is disclosed, for example, in US 2013/0327207.

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn, due to the airflow, and generates electrical and/or hydraulic power. The RAT is typically pivoted into position by means of an actuator, for example a hydraulic actuator. The actuator typically includes a piston which extends to deploy the RAT. A locking mechanism includes a lock bolt that prevents inadvertent movement of the actuator and, thus, inadvertent deployment of the RAT. The main locking mechanism typically comprises a spring loaded lock bolt which must be moved in an axial direction to unlock the actuator. Such an actuator is disclosed, for example, in US 2015/0232195. RAT actuators are also disclosed in U.S. Pat. Nos. 8,640,563, 9,193,472 and US 2015/0096437.

A toggle mechanism is provided to permit axial movement of the lock bolt to release the actuator piston for deployment of the RAT. A conventional toggle mechanism is shown, for example, in FIGS. 2A and 2B, comprising a linkage arrangement, one end of which is coupled to one end of the lock bolt and the other end of which is axially fixed and rotatably coupled to, for example, a mounting wall. A solenoid moves the link between a locked (FIG. 2A) and an unlocked (FIG. 2B) position. In the locked position, the linkage assembly pushes against the lock bolt against the force of the lock bolt spring to prevent axial movement of the lock bolt. When it is required to deploy the RAT, the lock bolt needs to be released for axial movement of the actuator.

As seen in FIG. 2B, a pull force, greater than the spring force, is exerted on the linkage assembly by means of a solenoid, which moves the linkage assembly out of engagement with the lock bolt. This allows the lock bolt to move axially to initiate actuator unlocking to permit deployment. The solenoid must have sufficient force to displace the lock bolt against the force of the lock bolt spring and the linkages and joints require sufficient axial and radial space and may also be prone to wear or damage.

An alternative toggle release mechanism is described, for example, in U.S. Pat. No. 10,310,543, in which the toggle mechanism includes a spring biased axially moveable toggle head, mounted to a piston which is caused to move, within a housing, by means of a solenoid, along the same axis as the lock bolt, to permit movement of the lock bolt, and therefore to allow release of the actuator for deploying the RAT. An alternative release mechanism is disclosed in U.S. Pat. No. 10,113,568.

The toggle mechanism for deploying a RAT actuator has been found to be the part of the RAT system that is the most vulnerable to failure and its operation is subject to a number of variable factors including the forces needed to trigger the toggle mechanism and the stroke that the toggle piston has to travel to change the operation position of the toggle.

Whilst known axial release mechanisms work well, there is a desire to provide an improved release assembly which is linear with respect to the lock bolt and actuator to provide a more simple, compact arrangement and which is reliable and efficient and requires less force for its reliable operation.

SUMMARY

The present invention provides an actuator release mechanism comprising: a longitudinal sleeve movable along an axis between a lock position and a release position; drive means for causing the longitudinal sleeve to move along the axis; and bias means to bias the longitudinal sleeve to the lock position; wherein the drive means comprises: a rotary solenoid having a first direction of rotation and a second direction of rotation; a toggle member having a toggle shaft connected to and rotatable with the rotary solenoid, and a toggle head in engagement with the longitudinal sleeve by means of at least one pin extending radially inwards from the longitudinal sleeve and a helical guide rail provided on a radially outer surface of the toggle head, the longitudinal sleeve being mounted around the toggle head, such that rotation of the solenoid causes rotation of the toggle member and the guide rails which causes the pin(s) to ride along the guide rail to rotate the sleeve and cause axial movement of the sleeve relative to the toggle member The bias means is preferably a spring and in the embodiment shown, this biases the sleeve in the lock position. When the solenoid is energized, this causes the longitudinal sleeve to rotate and move axially against the spring bias.

Also provided is a RAT actuator assembly and a RAT assembly.

BRIEF DESCRIPTION OF THE DRAWINGS

Preferred embodiments will now be described by way of example only and with reference to the accompanying drawings in which:

FIGS. 5A to 5C illustrate operation of the release mechanism of FIG. 3 for stowing the actuator;

DETAILED DESCRIPTION

Figure 1:
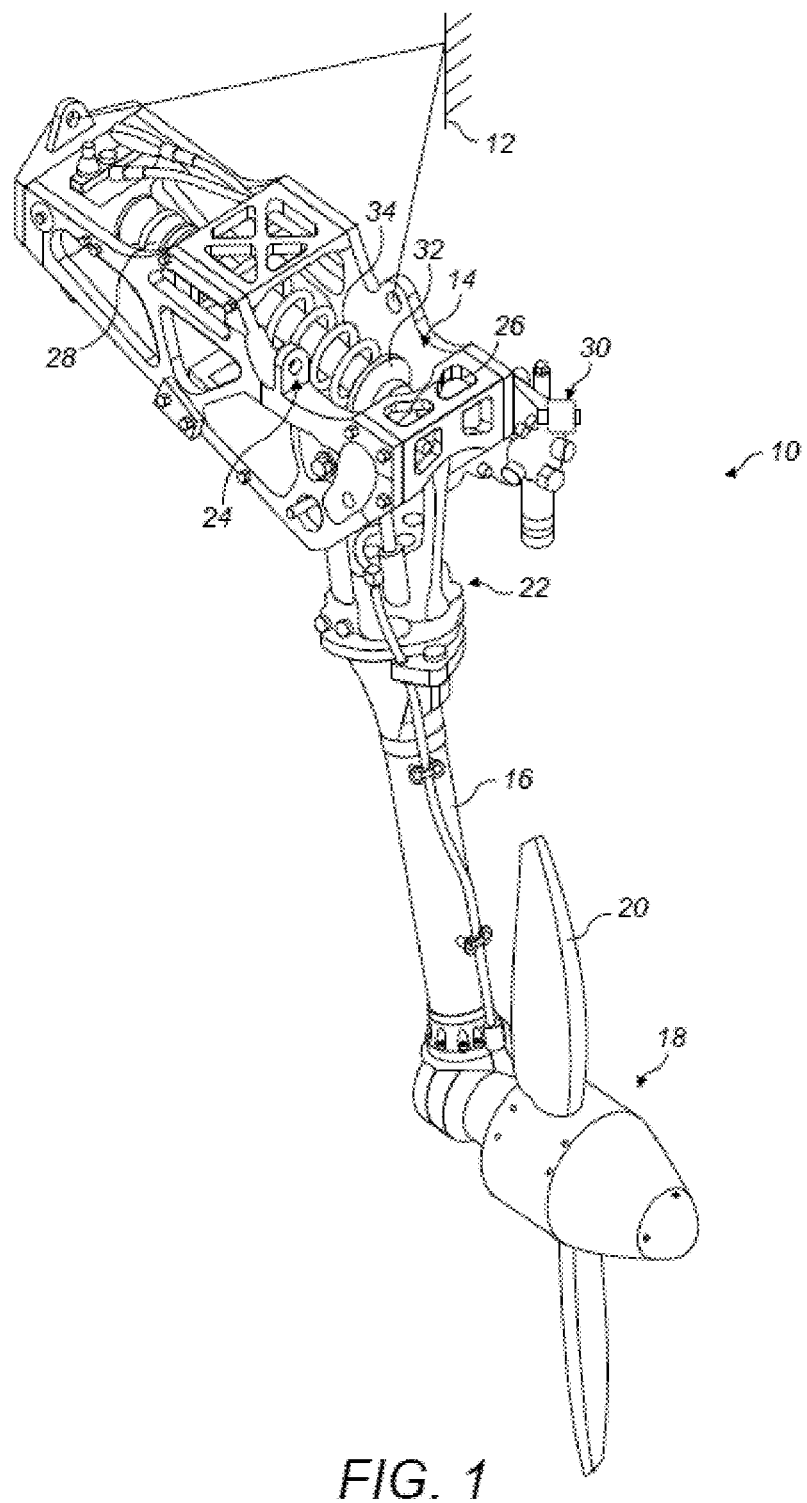
FIG. 1 shows a ram air turbine (RAT)

FIG. 1 shows a RAT system 10 which is secured to an aircraft structure 12 by housing 14. The housing 14 pivotally supports a strut 16 having a turbine 18 at one end. The turbine 18 includes blades 20 which impart rotational drive to a generator 22 and a hydraulic pump 30, for example. An actuator 24 is secured to the strut at a first end 26 and to the housing at a second end 28. The actuator 24 is illustrated in its deployed position. The actuator 24 comprises a cylinder 32 which is biased by a spring 34 in order to deploy the strut 16. When the cylinder 32 is retracted, it is held in its retracted position by means of a lock bolt, details of which will be described below.

The unlocking or release of the actuator is initiated by permitting movement of the lock bolt 38. This is made possible by means of a release mechanism according to the present disclosure which will be described further below.

In the present mechanism, this is done by activating or energizing the solenoid 1. This pulls the sleeve away from the lock bolt 38. The lock bolt 38 is then able to move under the force of a lock bolt spring mechanism. When the lock bolt has reached its deployment position, the actuator deployment mechanism which, in the case of a RAT, for example, comprises rollers and uplock pawls, can operate to deploy the actuator.

Figure 2A:
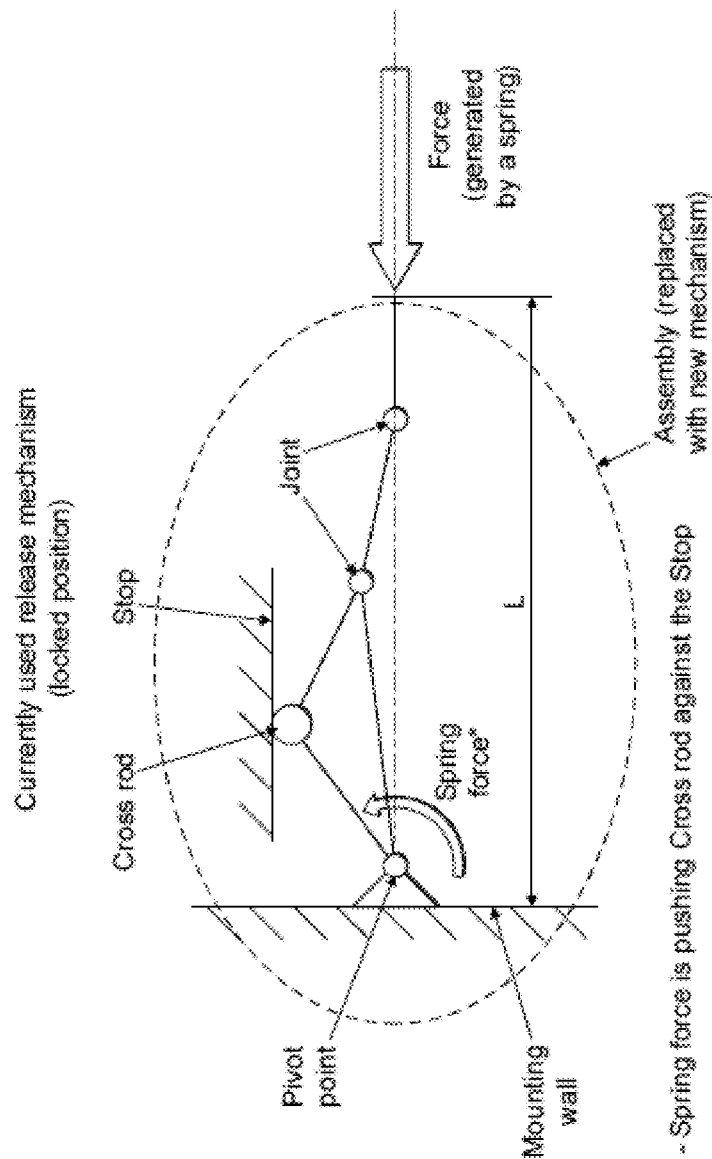
FIG. 2A shows a schematic view of a typical linkage release mechanism in the locked position.
Figure 2B:
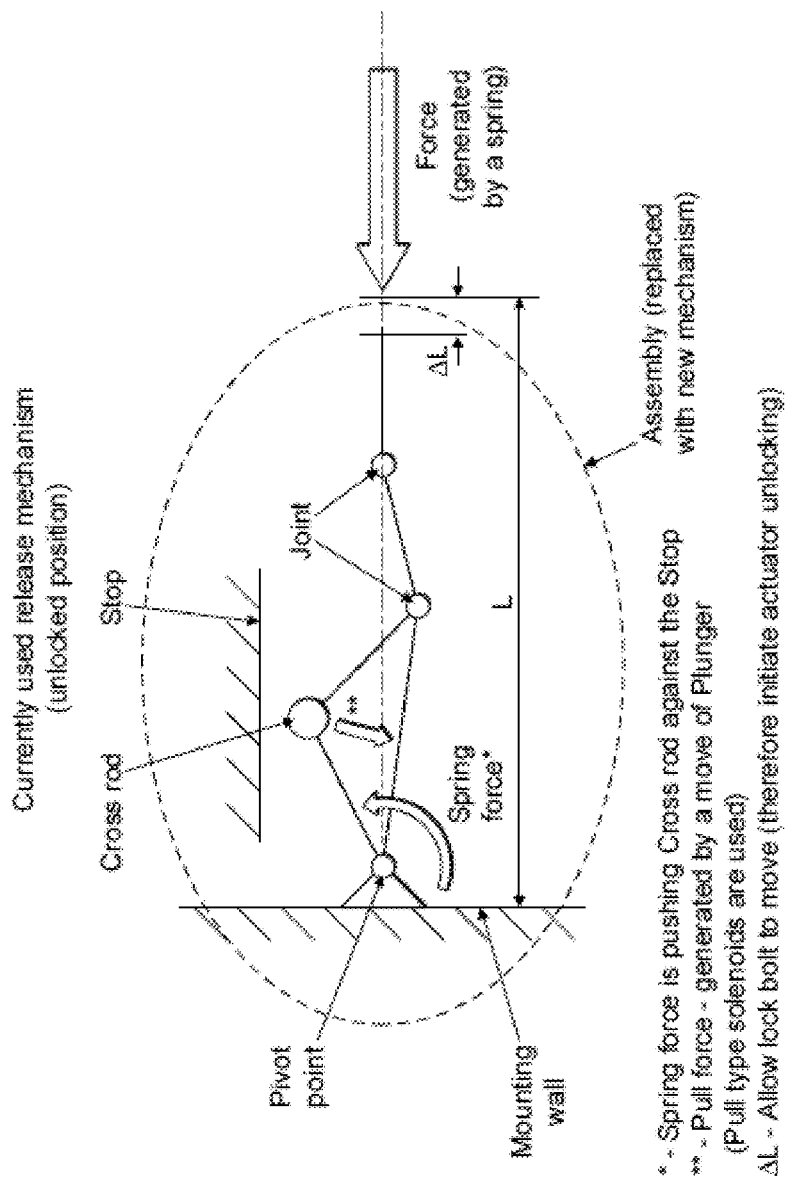
FIG. 2B shows the mechanism of FIG. 2A in the unlocked position.
Figure 3:
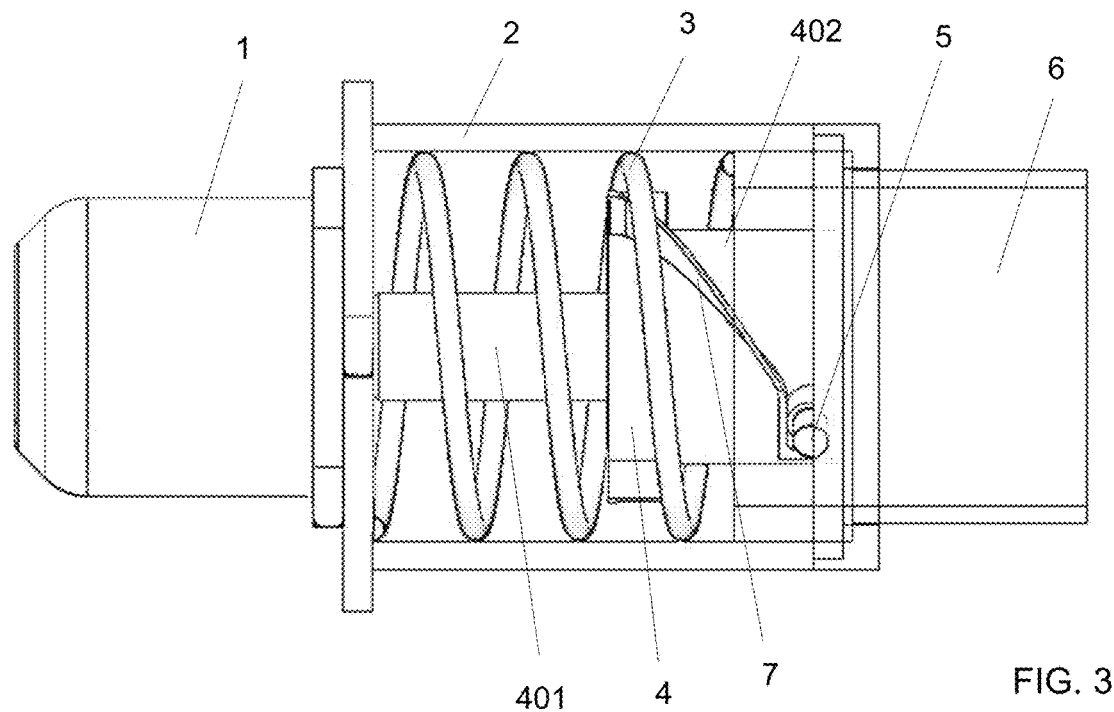
FIG. 3 shows a schematic view of a release mechanism according to the disclosure, which would replace the conventional mechanism shown within the dashed lines of FIGS. 2A and 2B.

FIGS. 3 to 5 show a release mechanism which would replace the conventional, linkage-type mechanism shown within the dashed lines of FIGS. 2A and 2B.

Referring first to FIG. 3, the main elements of the release mechanism according to the disclosure include a rotary solenoid 1, a rotary toggle 4 including a toggle shaft 401 and a toggle head 402 mounted to and for rotation with the rotary solenoid 1, and a toggle sleeve 6 mounted around and axially movable relative to the toggle head 402 (the axis defined through the solenoid and along the axis of the toggle shaft through the toggle head). A toggle spring 3, mounted around the toggle shaft and toggle head, biases the sleeve 6 axial away from the solenoid. The toggle, toggle spring and toggle sleeve are provided in a housing 2.

The toggle head includes helically formed guide rails 7 on its radially outer surface. One or more pins 5 is provided on the radially inner surface of the toggle sleeve, extending radially inwards and engaging in the guide rails 7, to provide engagement between the sleeve and the toggle head. As the toggle head rotates about the axis due to rotation of the solenoid (described in more detail below), the guide rails 7 guide the pin(s) 5 therealong which causes the sleeve 6 to be driven helically along the toggle head, against the bias of the toggle spring 3 towards the solenoid 1. As the toggle sleeve is moved axially towards the solenoid, it releases the lock bolt (not shown here) to unlock the actuator for RAT deployment.

The deployment process will now be described in more detail with reference to FIGS. 4A to 4C.

Figure 4A:
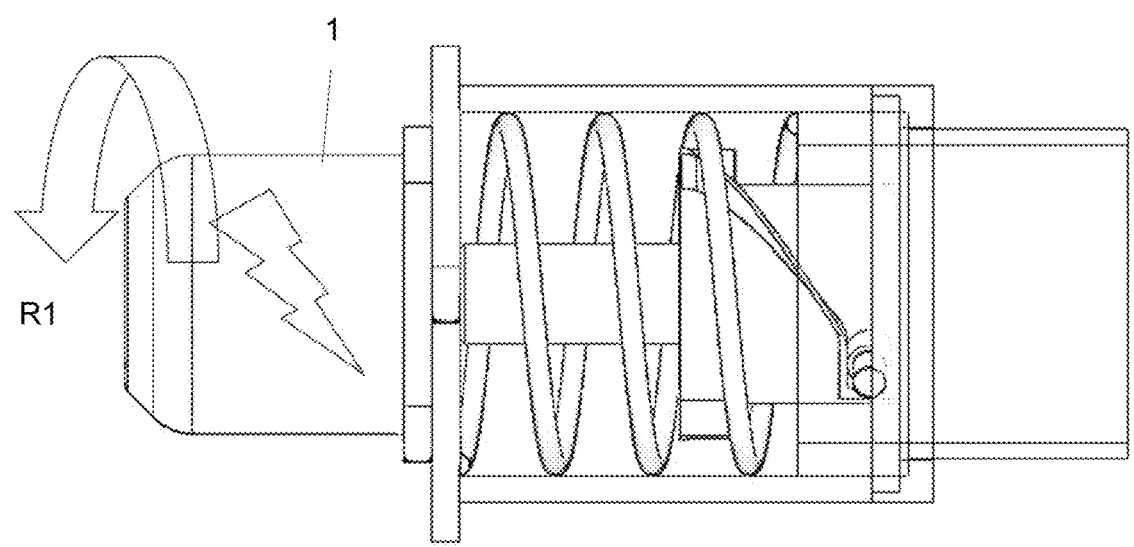
FIGS. 4A to 4C illustrate operation of the release mechanism of FIG. 3 for deploying the actuator.
Figure 4B:
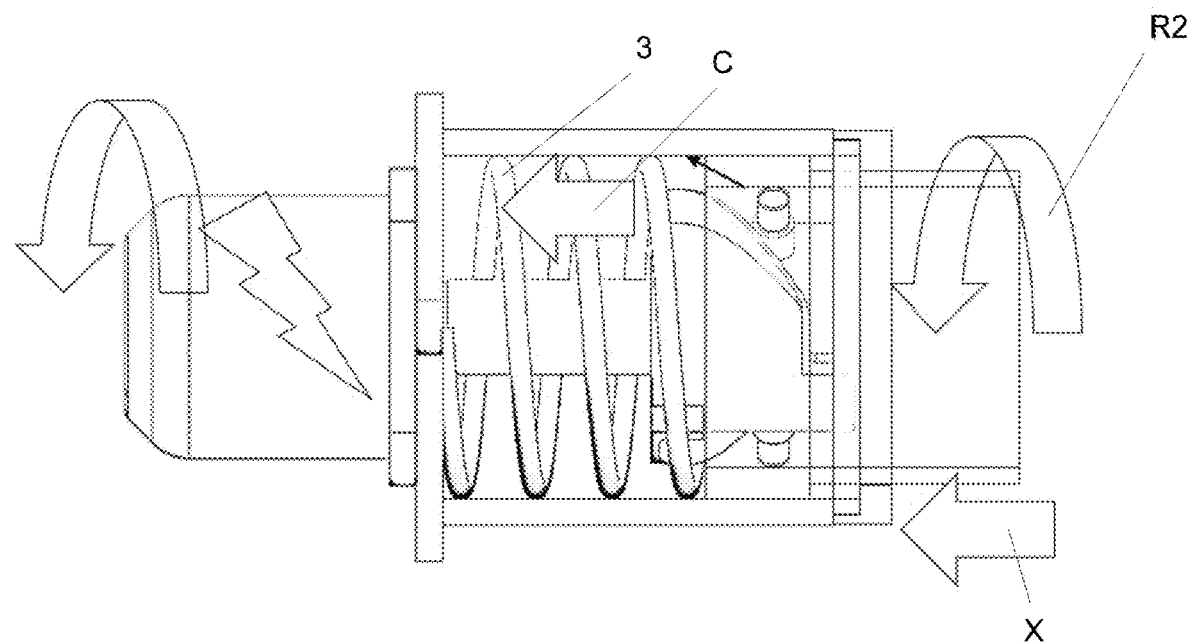

In the default (stowed) state, the RAT actuator is secured in its locked (not activated) position by the lock bolt 38 and the lock bolt is locked in position by means of the toggle assembly—here by means of the toggle sleeve in its extended position shown in FIG. 4A. To deploy the actuator, the lock bolt 38 must be able to move axially—usually a short distance of around 9 mm. To allow this, some axial space must be provided between the toggle/sleeve and the lock bolt which means that the sleeve will need to be moved axially away from the lock bolt.

To release the actuator to deploy the RAT, the rotary solenoid 1 is energised to rotate in the direction of arrow R1 which causes corresponding rotation of the toggle shaft 401 and toggle head 402. As the toggle head rotates, the guide rails 7 also rotate causing the pin(s) 5 of the sleeve 6 to move along the guide rails thus causing the sleeve to rotate in the direction of arrow R2 and, at the same time, move axial in the direction of arrow X towards the solenoid, compressing the toggle spring 3 (arrow C). This moves the sleeve of the release mechanism to the unlocked position (axially retracted with respect to the housing and relative to its extended position) which enables the lock bolt 38 to move. to release the actuator for RAT deployment.

Figure 4C:
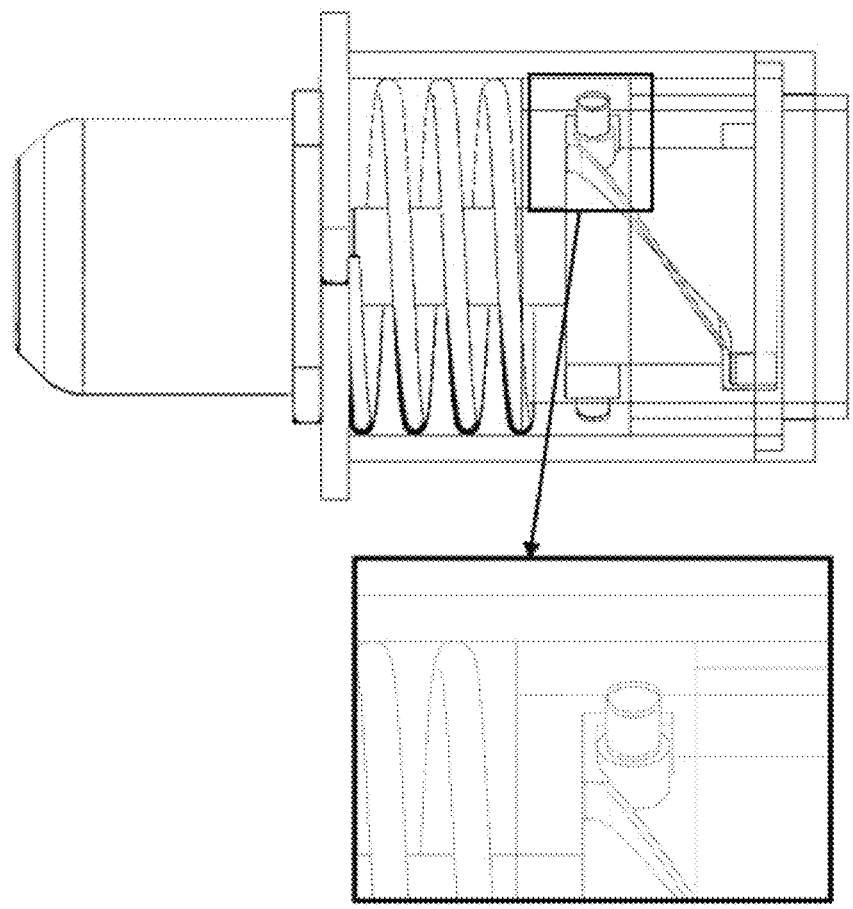

In the example shown, the guide rails 7 may terminate at their axially inward end with a detent e.g. a recess or U-shaped slot, into which the pin(s) lock at the end of the helical axially inward movement when the sleeve is in the unlocked position (as shown in FIG. 4C). In this way, the sleeve can be secured by the retention of the pins, in the unlocked position even if the solenoid is de-energised, since the retention of the pins prevents the spring 3 from expanding.

Figure 5C:
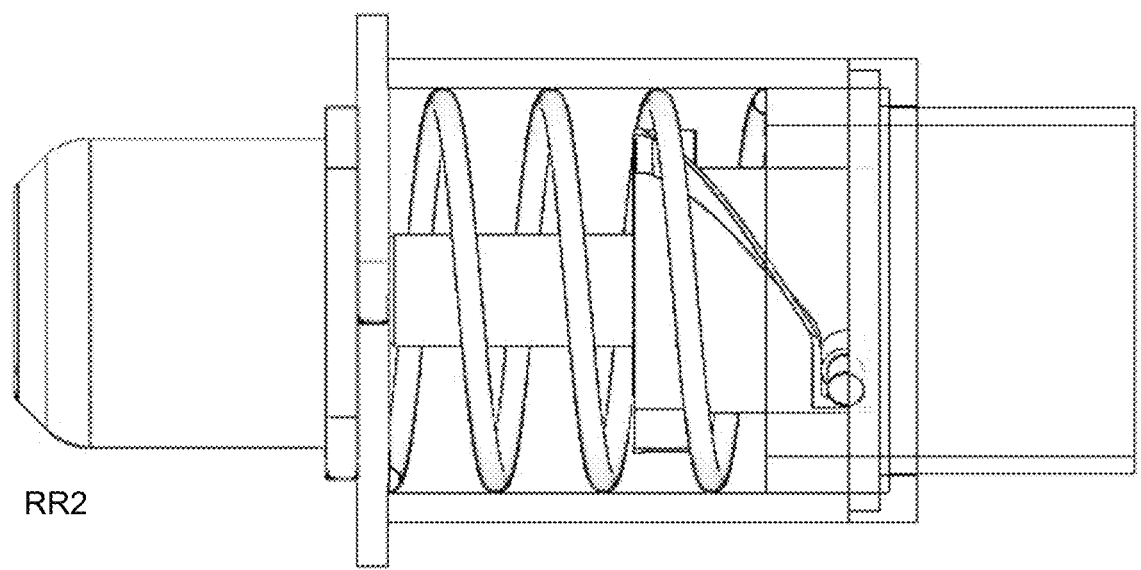

To stow the RAT, the process is reversed, as shown in FIGS. 5A to 5C. The rotary solenoid is energised to rotate in the opposite direction RR1 to the direction R1. This causes the pin(s) to disengage from the detent (in the event that the design includes such a detent) and so the sleeve 6 is forced axially in the extending direction Y as the spring 3 is now released and expands (arrow E) to its default state. At the same time as it moves axially in direction Y, the engagement of the pin(s) with the helical guide rails on the toggle head cause rotation of the sleeve 6 in direction RR2 until the spring is fully expanded and the pins have reached the end of the guide rails as shown in FIG. 5C. At this stage, the sleeve 6 is extended relative to the housing to its locked position where it abuts against or secures the lock bolt 38 to prevent movement of the lock bolt and thus to prevent release of the actuator and the actuator therefore remains in the stowed position.

The movement of the pins along the guide rails is a rolling movement defined by the theory of rolling resistance where:

$F_t r = Nf$, and $N = F_S - F_{sm}$, and $F_T = fN/r$

Where:

$F_{sm}$ is the force from the toggle spring,

F is the rolling friction coefficient $F_t$ is the rolling friction force, and $F_S$ is the force from the actuator spring acting to bias the sleeve to the unlocked position.

Figure 6:
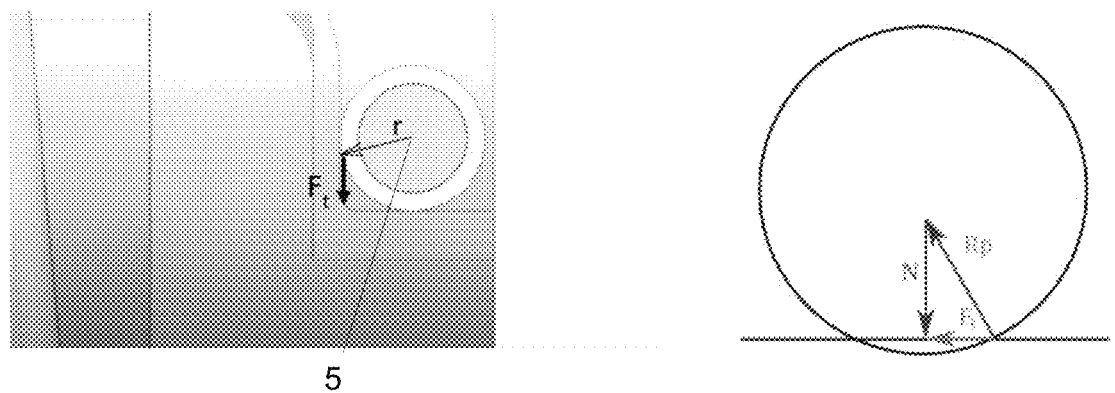
FIG. 6 illustrate the forces acting on the release mechanism.
Figure 6:
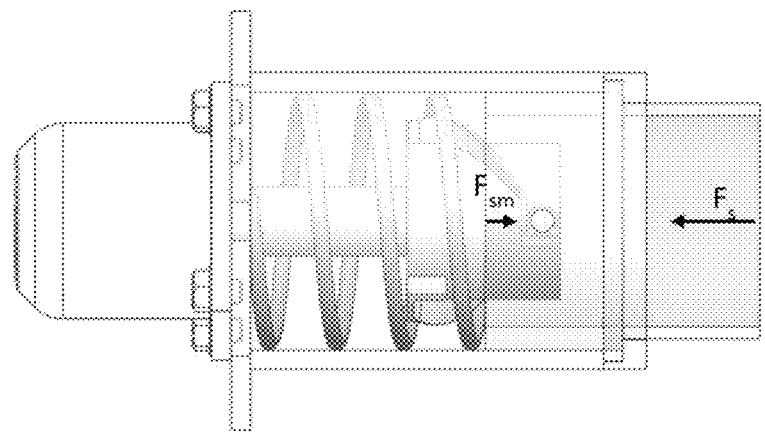
Figure 7:
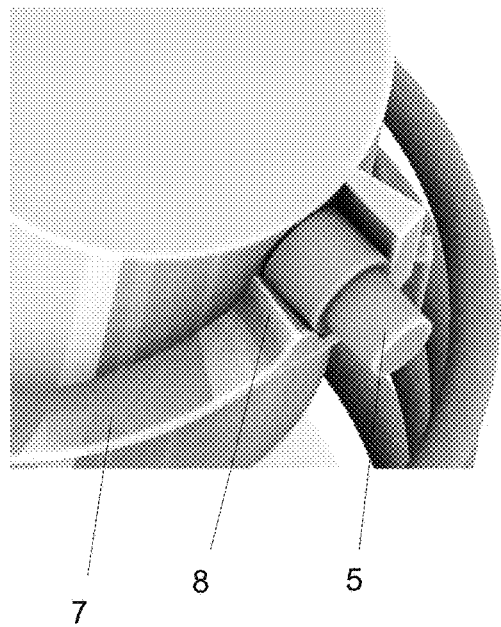
FIG. 7 shows a detail of the release mechanism of FIG. 3.
Figure 8:
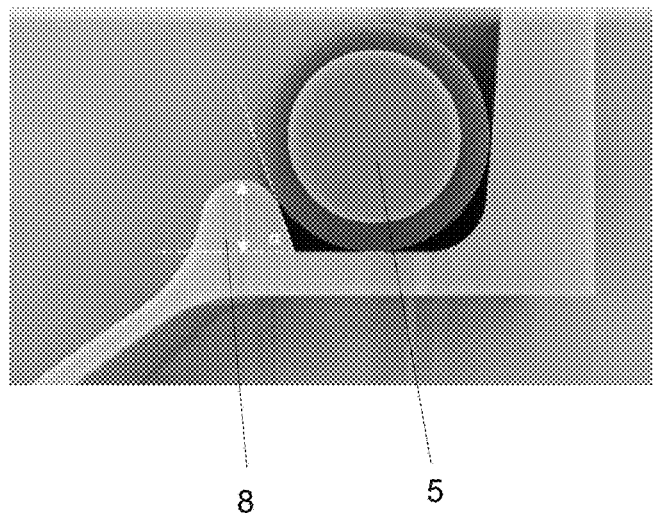
FIG. 8 shows a detail of the mechanism of FIG. 7.

These forces acting on the pin 5 are shown in FIG. 6

Depending on the materials used for the pins and the guide rails, the friction between the pin and the guide rail may be too low to avoid the pin being inadvertently moved along the guide rail due to vibrations in the system. This can be a particular problem in high vibrational environments such as in aircraft. To avoid this problem, the design of the guide rails can be modified to include a stop 8 to secure the pin 5 at the start of the guide rail until sufficient force is applied for the pin to ride over the stop 8 and commence its travel along the guide rail. The size of the stop should be selected such that the force needed for the pin to overcome the stop corresponds to the force applied to release the locking mechanism. This ensures that the release mechanism remains in the stowed position and is protected against inadvertent deployment.

In this design, the additional force needed during release of the mechanism will be $F_a=kx$ where x is the height of the stop 8 and k is the spring rate of the actuator spring. The force of the spring actuator causing release of the mechanism is, therefore, $F'_s=F_s+F_a$. The slope a can be varied to vary the rate of release.

Various rotary solenoids, with different degrees of rotation, are known that can be used in this design. Selection may be based on the required torque.

The design according to the disclosure is a simple, compact and relatively inexpensive arrangement that requires less force to lock or unlock the actuator whilst still being safe and reliable.

This mechanism could be easily adapted to existing actuators.

The above is a description of a single embodiment by way of example only. Modifications may be made without departing from the scope of this disclosure.

While the apparatus has been described in the context of unlocking a RAT actuator, it may, as mentioned above, find use in other applications, for example of the types of actuator, valves, pumps or the like.

The invention claimed is:

1. An actuator release mechanism comprising:
    a longitudinal sleeve movable along an axis between a lock position and a release position;
    drive means for causing the longitudinal sleeve to move along the axis; and
    bias means to bias the longitudinal sleeve to the lock position;
    wherein the drive means comprises:
        a rotary solenoid having a first direction of rotation and a second direction of rotation; and
        a toggle member having a toggle shaft connected to and rotatable with the rotary solenoid, and a toggle head in engagement with the longitudinal sleeve by means of at least one pin extending radially inwards from the longitudinal sleeve and a helical guide rail provided on a radially outer surface of the toggle head, the longitudinal sleeve being mounted around the toggle head, such that rotation of the solenoid causes rotation of the toggle member and the helical guide rail which causes the pin(s) to ride along the helical guide rail to rotate the sleeve and cause axial movement of the sleeve relative to the toggle member.

2. The mechanism of claim 1, wherein the bias means is a spring mounted around the toggle shaft.

3. The mechanism of claim 1, wherein the helical guide rail terminates at an axially inward end provided with a detent for securing the pin at an end of travel along the helical guide rail.

4. The mechanism of claim 3, wherein energisation of the rotary solenoid with a first direction causes corresponding rotation, in a first direction, of the toggle shaft and toggle head and the helical guide shaft(s) on the toggle head, which causes the pin(s) of the sleeve to ride along the helical guide rail(s) from an axially outward end of the helical guide rail to an axially inward end of the helical guide rail and causes the sleeve to rotate and to move axially against the bias means;
    wherein the pin(s) is/are retained in the detent when the solenoid is de-energised.

5. The mechanism of claim 4, wherein energisation of the rotary solenoid with a second direction causes corresponding rotation, in a second direction, of the toggle shaft and toggle head and the helical guide shaft(s) on the toggle head, which causes the pin(s) of the sleeve to ride along the helical guide rail(s) from the axially inward end of the helical guide rail to the axially outward end of the helical guide rail and causes the sleeve to rotate and to move axially under the force of the bias means.

6. The mechanism of claim 3, wherein the detent is in the form of a U-shaped slot.

7. The mechanism of claim 1, comprising two pins and two helical guide slots, one for each pin.

8. The mechanism of claim 1, further comprising a stop at an axially outward end of the helical guide rail, to retain the pin at that end until sufficient force is provided to the pin to allow it to ride over the stop and ride along the helical guide rail.

9. The mechanism of claim 8, wherein the force required to enable the pin to ride over the stop is $F_a=kx$, where k is the spring rate of the bias means and x is a height of the stop over which the pin must ride.

10. The mechanism of claim 1, wherein energisation of the rotary solenoid with a first direction causes corresponding rotation, in a first direction, of the toggle shaft and toggle head and the helical guide shaft(s) on the toggle head, which causes the pin(s) of the sleeve to ride along the helical guide rail(s) from an axially outward end of the helical guide rail to an axially inward end of the helical guide rail and causes the sleeve to rotate and to move axially against the bias means.

11. A ram air turbine (RAT) assembly comprising:
    a RAT shaft;
    a housing for the RAT shaft; and
    an actuator assembly as claimed in claim 10 for deploying the RAT shaft out of or stowing the RAT shaft into the housing.

12. A ram air turbine (RAT) actuator assembly comprising:
    a lock bolt; and
    an actuator release mechanism as claimed in claim 1, moveable relative to the lock bolt to permit or prevent axial movement of the lock bolt.

* * * * *